(12) United States Patent
Corsan

(10) Patent No.: US 6,554,540 B1
(45) Date of Patent: Apr. 29, 2003

(54) MODULAR GUIDING DEVICE

(75) Inventor: Robert Corsan, Baie Mahault (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/763,155

(22) PCT Filed: Aug. 24, 1999

(86) PCT No.: PCT/FR99/02035

§ 371 (c)(1),
(2), (4) Date: Feb. 20, 2001

(87) PCT Pub. No.: WO00/11770

PCT Pub. Date: Mar. 2, 2000

(30) Foreign Application Priority Data

Aug. 25, 1998 (FR) .............................. 98 10682

(51) Int. Cl.⁷ .......................... F16L 3/00; B65H 57/14
(52) U.S. Cl. ................. 405/184.4; 405/156; 242/615.2; 254/415; 226/180; 226/189; 226/194
(58) Field of Search ................. 405/156, 184, 405/184.1, 154.1, 184.4; 254/134.3 R, 134.3 PA, 134.3 CL, 134.3 FT, 134.3 SC, 415, 413; 29/241; 242/388.6, 388.7, 390.6, 397.1, 615.2; 226/180, 189, 194

(56) References Cited

U.S. PATENT DOCUMENTS

| | | | | |
|---|---|---|---|---|
| 1,735,301 A | * | 11/1929 | Short .................. | 254/134.3 FT |
| 1,865,113 A | * | 6/1932 | Kiesel, III ........... | 254/134.3 R |
| 2,629,768 A | * | 2/1953 | Beil .................... | 254/134.3 R |
| 3,104,792 A | * | 9/1963 | Walton ................ | 226/193 |
| 3,244,292 A | * | 4/1966 | Elliott .............. | 254/134.3 FT X |
| 3,853,804 A | * | 12/1974 | Jackson .......... | 254/134.3 PA X |
| 3,863,897 A | * | 2/1975 | Yeager ................ | 254/134.3 R |
| 3,871,621 A | * | 3/1975 | Jackson .............. | 254/134.3 PA |
| 4,228,990 A | * | 10/1980 | Horvath ............... | 254/134.3 FT |
| 4,423,853 A | * | 1/1984 | Davis, Sr. ......... | 254/134.3 R X |
| 4,447,013 A | * | 5/1984 | Sandered et al. . | 254/134.3 R X |
| 4,685,831 A | * | 8/1987 | Mahoney ................ | 405/156 |
| 5,324,006 A | * | 6/1994 | Pickrell .............. | 254/134.3 FT |

FOREIGN PATENT DOCUMENTS

| | | | | |
|---|---|---|---|---|
| DE | 381597 | * | 9/1923 | |
| DE | 7730332 | * | 1/1978 | |
| DE | 3019667 | * | 11/1981 | |
| DE | 3320379 | * | 12/1984 | |
| FR | 2556812 | * | 6/1985 | .......... 254/134.3 R |
| JP | 54034088 | * | 3/1979 | .......... 254/134.3 PA |

* cited by examiner

*Primary Examiner*—Jong-Suk (James) Lee
(74) *Attorney, Agent, or Firm*—Connolly Bove Lodge & Hutz LLP

(57) ABSTRACT

A modular guidance device for routing cable through an underground chamber includes a plurality of rollers positioned in adjacent relation. End plates hold the rollers in position. A support leg is connected to the end plates and a support member is secured to the support leg and is movable in different positions within the underground chamber. The support leg is further connected to articulation means for allowing the modular guidance device to be oriented according to the position of the support member during routing of the cable between inlet and outlet orifices of the underground chamber. The articulation means further includes two plates placed at right angles to a main axis of the support leg, the plates and respective support leg portions thereof facing each other and capable of rotating relative to each other and then fixed in position.

4 Claims, 2 Drawing Sheets

MODULAR GUIDING DEVICE

FIELD OF THE INVENTION

The present invention relates to a device for pulling through cables for underground chambers. It is aimed more specifically at a device for guiding fiber-optic cables or other categories of cables (coaxial, video, computer, telephone, etc. cables), or even cables intended for carrying electricity, through underground chambers comprising inlet and outlet orifices which are not placed in the same horizontal or vertical plane.

BACKGROUND OF THE INVENTION

Thus, when an underground chamber has a change in level between the cable inlet and outlet orifices, it is necessary to fit deflection pulleys, commonly one or perhaps two of these, to route the cable between these two levels.

Now, while the cable is being routed through the deflection pulley or pulleys, and during the pulling-through operation, the tensile forces imposed on the end of the cable or cables induce additional strains and a high probability of the risk of damage to the cable jacket and to the fibers inserted inside this jacket, it being possible even for the strains induced to lead to fiber breakage.

Document DE 381 597 discloses a device for guiding a cable through an underground chamber, routing between two directions. This device comprises an arm supporting a guide pulley, the latter being borne by a chassis routing over the chamber. In addition, the chassis comprises a crank system allowing the axis of the pulley support arm to be transversely offset.

The known devices comprise a guide system equipped with a number of bogie-shaped rollers which are juxtaposed and held between two elbowed end plates. These end plates, because of their radius of curvature, impart a direction change of 45, 90 or even 180° to the cables routed tangentially to the bogies, this end plate being equipped with a laterally projecting tab able to fasten to a support leg secured to the underground chamber.

The main disadvantage with this type of modular guidance device lies particularly in the fact that it allows adjustment in just one direction, in X, in Y or in Z.

BRIEF DESCRIPTION OF THE INVENTION

The present invention therefore aims to alleviate these drawbacks by proposing a modular guidance device which is not only suited to the characteristics of the cables (minimum bend radius allowed for the cable) but which can easily be adapted to suit any particular configuration encountered when pulling a cable through an underground chamber, and mainly of allowing multi-directional adjustment.

To this end, the modular guidance device which is the subject of the invention, is characterized in that it comprises a number of rollers which are juxtaposed and held in position by end plates, the end plates having a support leg for connecting said modular guidance device to a support member secured to an underground chamber, the support leg comprising, between its two ends, an articulation means allowing said modular guidance device to be oriented in all three dimensions with respect to the support member according to the relative arrangements of inlet or outlet orifices for the cable or cables routed through said underground chamber.

Other features and advantages of the present invention will become apparent from the description given hereinafter with reference to the appended drawings which illustrate one exemplary and entirely nonlimiting embodiment thereof. In the figures:

DETAILED DESCRIPTION OF THE INVENTION

Figure 1:
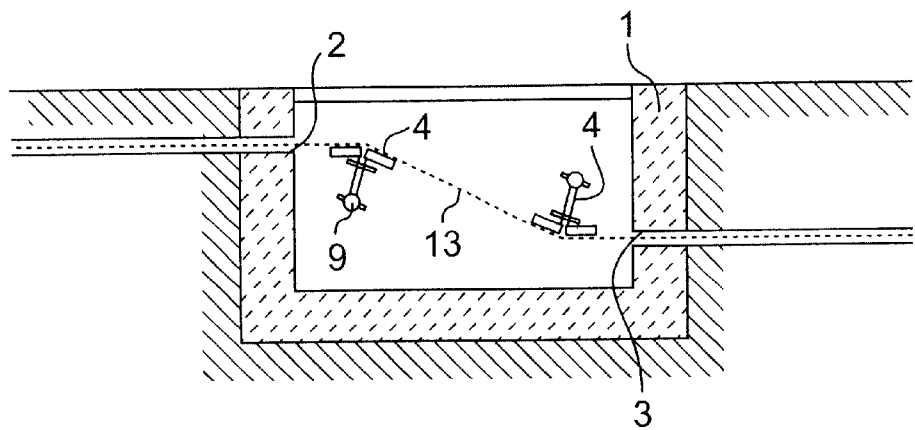
FIG. 1 is a view in section, in side elevation, of an underground chamber, the cable inlet and outlet orifices of which are not positioned in the same vertical plane, this chamber being equipped with devices that are the subject of the invention.
Figure 2:
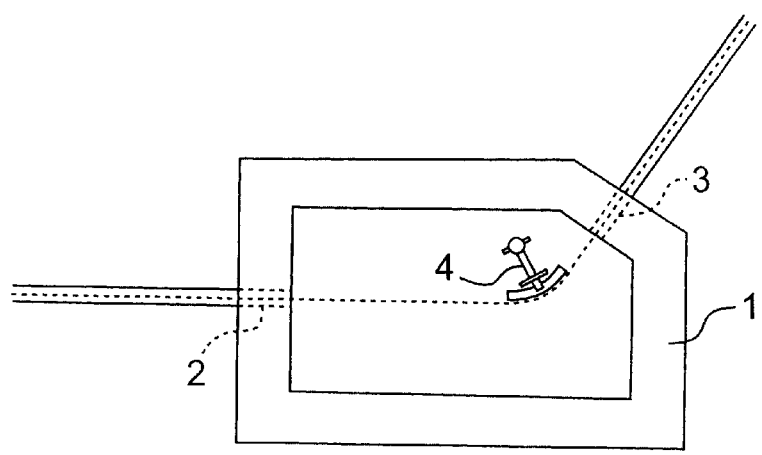
FIG. 2 is a view from above of an underground chamber, the cable inlet and outlet orifices of which are not positioned in the same horizontal plane, this chamber being equipped with devices that are the subject of the invention.

According to a preferred embodiment of the device that is the subject of the invention, this device is intended to be positioned inside an underground chamber equipped with cable inlet and outlet orifices, these orifices not being positioned in the same horizontal and vertical plane, making an L-shaped change in direction in each of the planes (cf. refer to FIGS. 1 and 2). In these figures, the reference 1 denotes the underground chamber, references 2 and 3 the inlet and outlet orifices, the dotted line denotes the cable routed between these two orifices and running tangentially to the modular guidance device or devices 4.

A modular device 4 that forms the subject of the invention (cf. FIG. 3) comprises a number of rollers 5 shaped as bogies, made of a plastic or metallic material and which are juxtaposed and held in position by end plates 6. For this purpose, each of the rollers has an orifice 11 passing right through it to allow for the passage of a spindle 12, possibly mounted on a rolling bearing, the ends of which are connected by known means (screwing, circlips, press fit, welding, etc.) to the walls of each of the end plates 6.

The end plates 6 have a curved profile which, depending on the tightness of the bend radius, determines a direction change of 45, 90 or even 180° between the two ends of the end plates 6.

Figure 3:
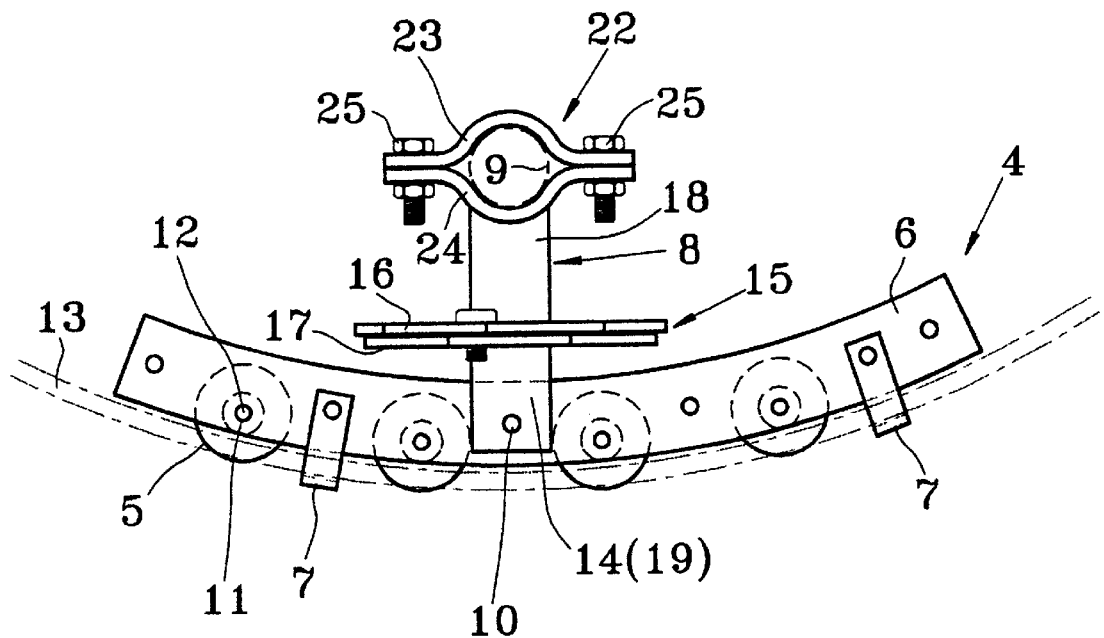
FIG. 3 is a view in section and side elevation of a guide device according to the invention.

The combination of the external walls forming the contour of each of the rollers generates a radius of curvature to which a cable 13 kept in contact with the running surfaces of each of the rollers by U-shaped bridges 7, also secured to the walls of the end plate runs tangentially (cf. FIG. 3).

Figure 4:
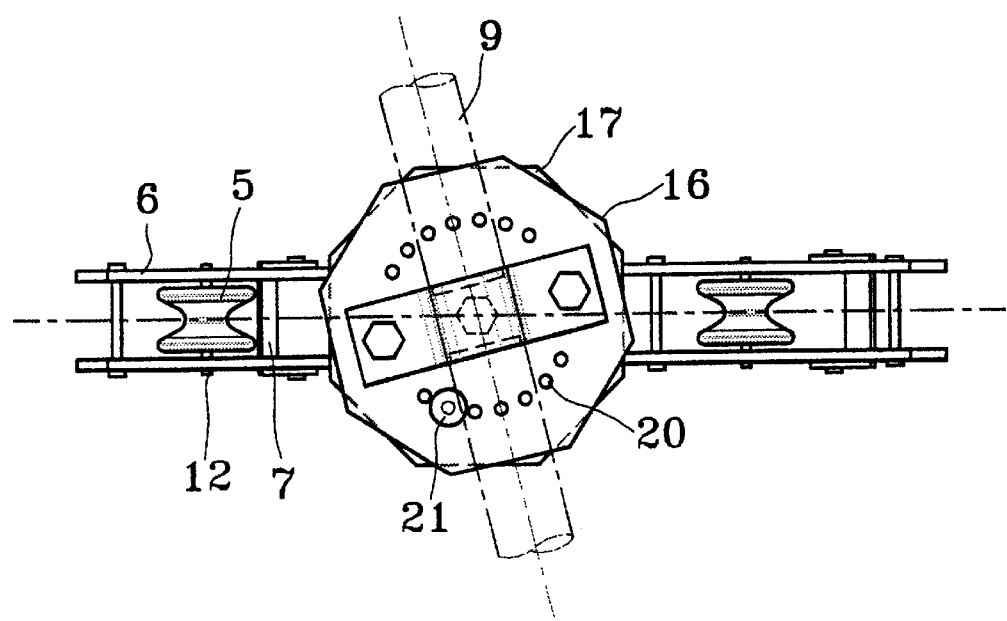
FIG. 4 is a view in section and from the side of a guide device according to the invention.

Provision is made for locating a support leg 8 approximately, but nonlimitingly, mid-way along the end plates 6 (at any point on the radius of curvature). This support leg 8 makes it possible to connect the modular guidance device 4 to a support member 9 secured to the underground chamber. This support member is depicted in FIG. 4.

One of the ends of the support leg 8 is formed by a projecting single tab 14 or a double, U-shaped, tab connected by known means 10 (screw and nut, spot weld, pin, etc.) to the walls of the guiding end plates 6.

Furthermore, an articulation means 15 is inserted between the two ends of the support leg 8.

This articulation means 15 makes it possible for the modular guidance device 4 to be oriented in all three dimensions with respect to the support member 9 according to the relative arrangements of the inlet and outlet orifices 2, 3 for the cable or cables routed through the underground chamber.

Thus, according to a first embodiment of the articulation means 15, the latter comprises two plates 16, 17 placed at right angles to the main axis of the support leg 8, the plates 16, 17 and their respective support leg portions 18, 19 facing each other and being able to rotate one with respect to the other by virtue of a number of orifices 20 distributed uniformly over the surface of each of the plates 16, 17 (cf. FIG. 4).

The relative angular position of these two plates is fixed using a collaboration means 21 of the screw or some other type passing through two orifices 20 in the plates 16, 17.

Figure 5:
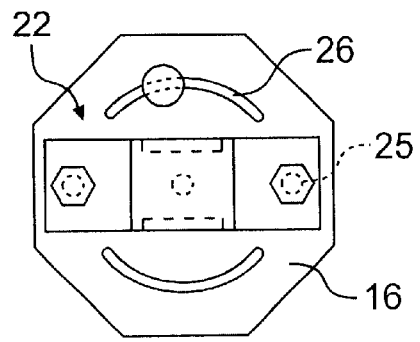
FIG. 5 is a detail view of the fixing tab.

According to a second embodiment of the articulation means 15 (refer to FIG. 5), the latter comprises two plates 16, 17, positioned in a similar way to the first embodiment, one of them comprising at least one slot 26, particularly an oblong slot, in which a guide member projecting with respect to the other plate can run.

According to a third embodiment of the articulation means 15 (not depicted in the figures), the latter comprises a ball joint between two portions forming the support leg 8.

Regardless of the embodiment, the free end of the support leg 8 has a yoke 22 made in two parts 23, 24 making it possible, by virtue of clamping members 25, to secure the support leg 8 to the support member 9.

The present invention as previously described offers numerous advantages because it is able to be adapted, with a low number of modular guidance devices, to suit the characteristics of the cables (minimum permissible dynamic bend radius for the cable—which is a deciding factor in the correct accomplishment of the cable-pulling operations), and the particular configurations encountered on site.

It should remain clearly understood that the present invention is not restricted to the exemplary embodiments described and depicted hereinabove, but that it encompasses all variations thereon.

What is claimed is:

1. A modular guidance device for routing cable through an underground chamber, comprising:

a plurality of rollers positioned in adjacent relation;

end plates holding the rollers in position;

a support leg connected to the end plates;

a support member secured to the support leg and orientable in different positions within the underground chamber;

the support leg further connected to articulation means for allowing the modular guidance device to be oriented according to the position of the support member during routing of the cable between inlet and outlet orifices of the underground chamber;

the articulation means further including two plates placed at right angles to a main axis of the support leg, the plates and respective support leg portions thereof facing each other and capable of rotating relative to each other;

the plates having a plurality of holes formed therein to allow a relative rotation of the plates to be fixed by a collaboration means passed through preselected aligned holes in the plates.

2. A modular guidance device for routing cable as described in claim 1, wherein the support leg has a free end provided with a yoke having two parts cooperating with clamping members for securing the support member to the support leg.

3. A modular guidance device for routing cable through an underground chamber, comprising:

a plurality of rollers positioned in adjacent relation;

end plates holding the rollers in position;

a support leg connected to to the end plates;

a support member secured to the support leg and orientable in different positions within the underground chamber;

the support leg further connected to articulation means for allowing the modular guidance device to be oriented according to the position of the support member during routing of the cable between inlet and outlet orifices of the underground chamber;

the articulation means further including two plates placed at right angles to a main axis of the support leg, the plates and respective support leg portions thereof facing each other and capable of rotating relative to each other;

at least one of the plates of the articulation means having a slot formed therein for receiving a guide member projecting there through to allow a relative rotation of the plates to be fixed.

4. A modular guidance device for routing cable as described in claim 3, wherein the support leg has a free end provided with a yoke having two parts cooperating with clamping members for securing the support member to the support leg.

* * * * *